(12) United States Patent
Adjwok

(10) Patent No.: US 7,597,380 B1
(45) Date of Patent: Oct. 6, 2009

(54) HARD TOP CONVERTIBLE ROOF SYSTEM

(76) Inventor: Joseph Adwok Adjwok, Luton 1, F.Gen, Birkirkara BKR (MT)

( * ) Notice: Subject to any disclaimer, the term of this patent is extended or adjusted under 35 U.S.C. 154(b) by 0 days.

(21) Appl. No.: 12/248,531

(22) Filed: Oct. 9, 2008

Related U.S. Application Data

(60) Provisional application No. 60/978,463, filed on Oct. 9, 2007.

(51) Int. Cl.
*B60J 7/00* (2006.01)
(52) U.S. Cl. .............................. 296/107.08; 296/107.17
(58) Field of Classification Search ............ 296/107.17, 296/107.08, 136.05, 108
See application file for complete search history.

(56) References Cited

U.S. PATENT DOCUMENTS

| | | | |
|---|---|---|---|
| 5,746,470 A | 5/1998 | Seel et al. | |
| 5,839,778 A | 11/1998 | Schaible et al. | |
| 5,944,375 A | 8/1999 | Schenk et al. | |
| 6,019,416 A * | 2/2000 | Beierl | 296/107.17 |
| 6,419,294 B2 * | 7/2002 | Neubrand | 296/76 |
| 6,616,213 B2 | 9/2003 | Koch | |
| 6,637,802 B2 | 10/2003 | Obendiek | |
| 6,652,017 B2 | 11/2003 | Wagner et al. | |
| 6,722,723 B2 | 4/2004 | Obendiek | |
| 6,767,047 B2 | 7/2004 | Eichhorst | |

* cited by examiner

*Primary Examiner*—Joseph D Pape
(74) *Attorney, Agent, or Firm*—Quick Patents, Inc.; Kevin Prince

(57) ABSTRACT

A retractable hard-top roof for a convertible-roof vehicle is disclosed. The roof comprises a forward roof panel and a rear roof panel. The panels fit together flush when the roof is in a top-up position. In a top-down position the panels are stowed in a roof stowage deck. A pair of roof hinge mechanisms moves the roof panels between the top-up position and the top-down position with a first linear actuator. A pair of tonneu cover mechanisms raises and then lowering a tonneu cover when the roof panels are moved from one position to the other. A roof deck lid, a front roof panel lock, and a pillar roof lock may also be included to secure the roof in either its top-up or top-down positions.

6 Claims, 7 Drawing Sheets

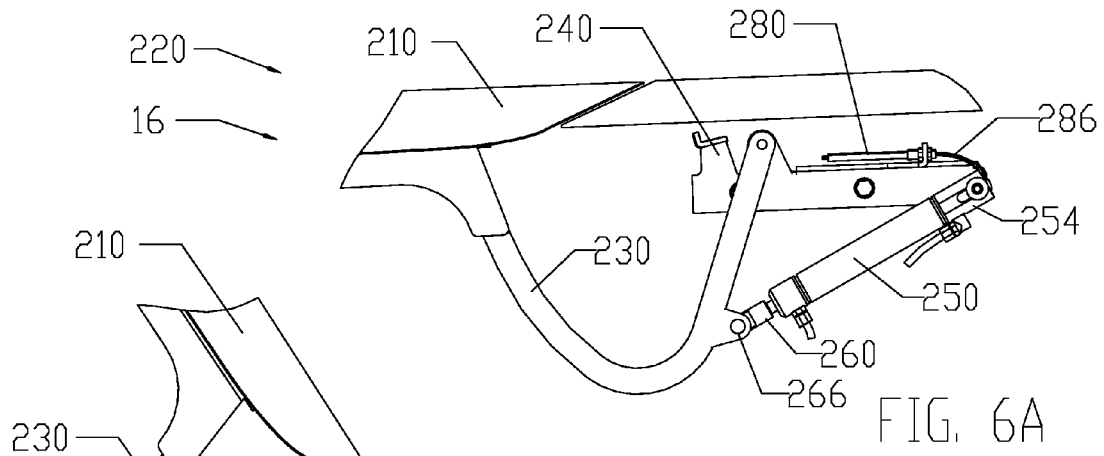
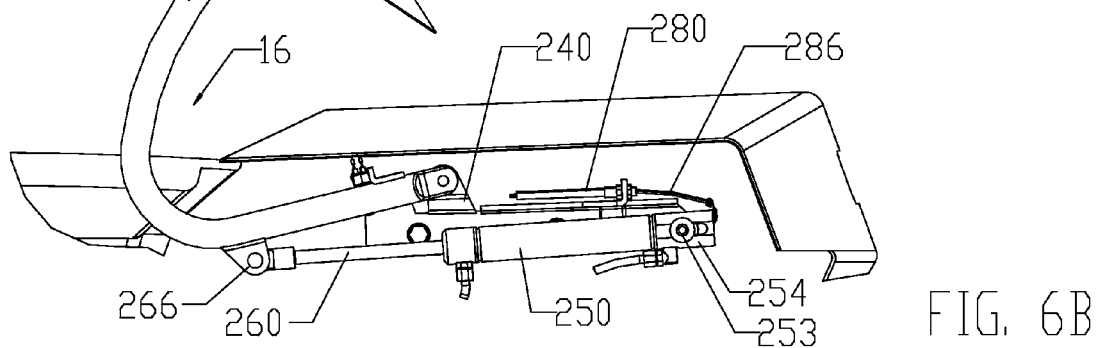
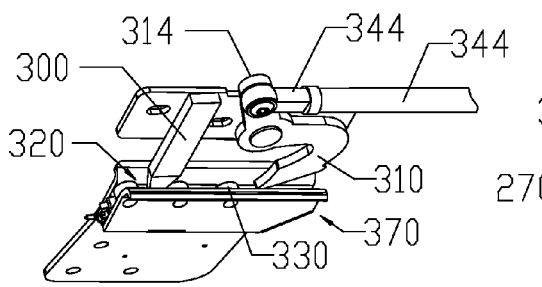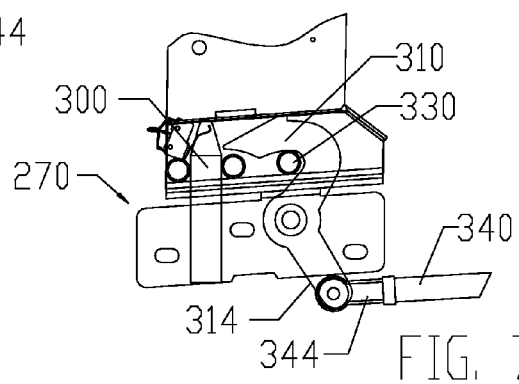
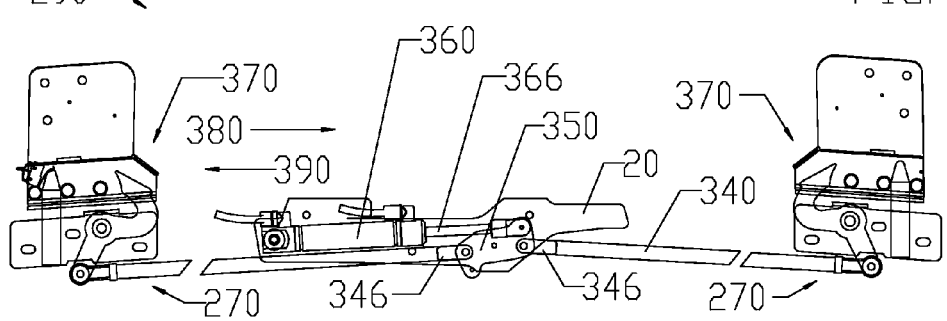

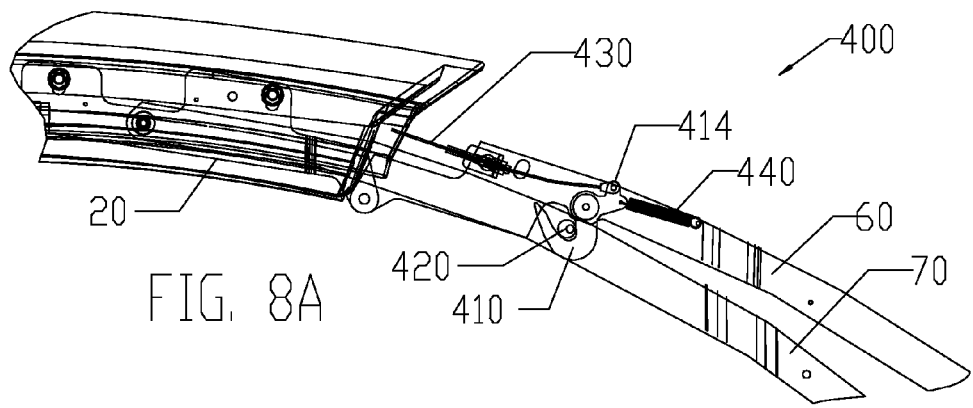
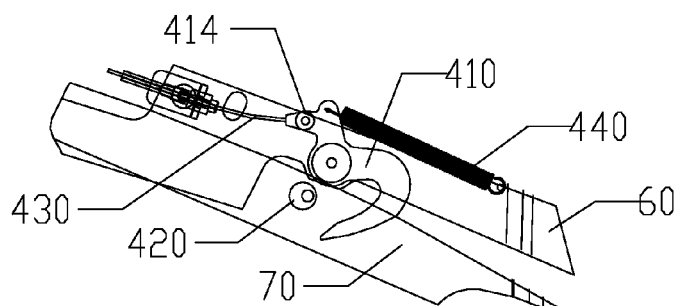
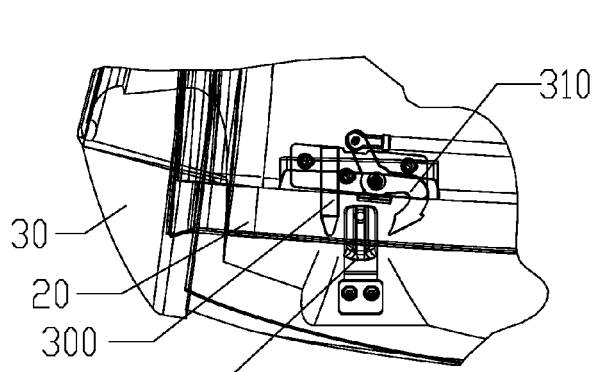 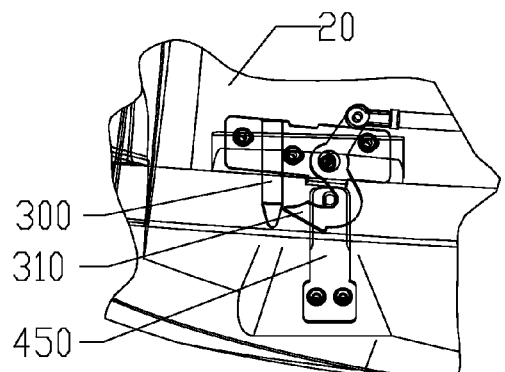
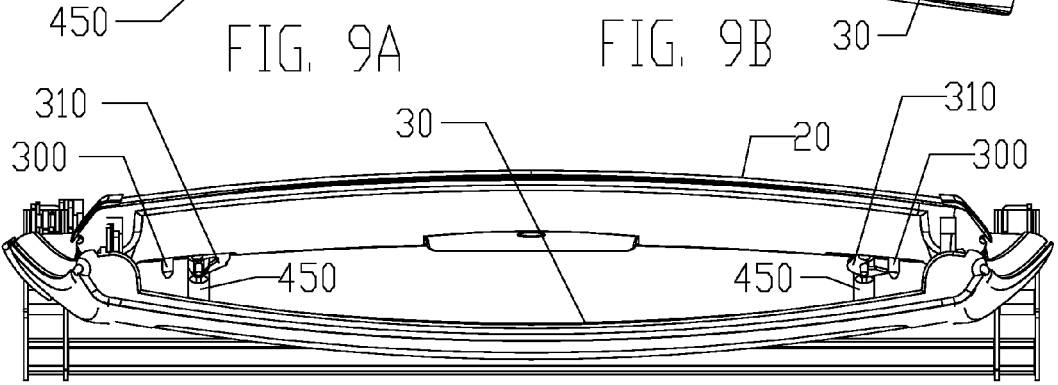

HARD TOP CONVERTIBLE ROOF SYSTEM

CROSS-REFERENCE TO RELATED APPLICATIONS

This application claims the benefit of U.S. Provisional Patent Application 60/978,463, filed on Oct. 9, 2007, and incorporated herein by reference.

STATEMENT REGARDING FEDERALLY SPONSORED RESEARCH AND DEVELOPMENT

Not Applicable.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

FIELD OF THE INVENTION

This invention relates to convertible automobiles, and more particularly to a novel mechanism for extending and retracting a hard convertible top.

DISCUSSION OF RELATED ART

Convertible vehicle roof retracting devices of the prior art suffer from excessive moving parts, and therefore from excessive manufacturing costs and decreased reliability. Further, some prior art devices are well suited for a particular function (such as reliable deployment and retraction of the roof), but fail to efficiently or reliably perform in other functions (such as locking the roof to the windshield assembly).

U.S. Pat. No. 6,767,047, issued to Eichhorst et al. on Jul. 27, 2004, teaches a convertible roof latch having at least a pair of coil springs. Such springs are prone to wear and eventual failure over time, and thus a more reliable latching mechanism is desirable.

U.S. Pat. No. 5,746,470 to Seel et al. on May 5, 1998, teaches a convertible hard-top vehicle wherein a roof section includes a retraction mechanism that is disparate from a tail-end pivoting section and mechanism for retracting and extending same. In the event that the second mechanism fails to retract, damage can be done to the vehicle by attempting to retract the roof. As such, it is preferable to have a single mechanism that handles both functions.

U.S. Pat. No. 5,839,778 to Schaible et al. on Nov. 24, 1998, and U.S. Pat. No. 5,944,375 to Schenk et al. on Aug. 31, 1999, both teach mechanisms for locking the roof to the vehicle. The -375 patent discloses a manually-actuable device. Requiring manual actuation in any portion of the process of either stowing or deploying a convertible vehicle roof increases the risk that the manual step may be neglected, which can cause the motorized or hydraulic portion to cause damage to other portions of the vehicle. On the other hand, the -778 device has a relatively large number of moving parts, and as such is relatively expensive to manufacture, even though such a device is fully automated.

U.S. Pat. No. 6,722,723, to Obendiek on Apr. 20, 2004, teaches a roof mechanism for a convertible vehicle. Such a device includes a mechanism for opening a rear portion of the car for storage of the roof therein, and provides for flaps that pivot upward out of the way of the roof deployment mechanism. It is preferably, however, to retract the flaps completely out of view when the roof is deployed, both for aesthetics and for reducing the risk of damage to the flaps.

U.S. Pat. No. 6,616,213 to Koch on Sep. 9, 2003 teaches a mechanism for stowing a convertible roof in a trunk area at the back of a vehicle, and a tonneu cover for covering the trunk area. Two flaps for allowing passage of the mechanism through the cover while the roof is deployed pivot out of the way in such a configuration. However, to create the clearance required for such flaps to fully pivot out of the way, a truck lid must be fully extended while the flaps are changing position. This is not only inconvenient, but in inclement weather, which is often when a convertible roof needs to be deployed, items in the trunk can be damaged.

U.S. Pat. No. 6,652,017 to Wagner et al. on Nov. 25, 2003 teaches a multi-part mechanism that works to deploy and retract a convertible vehicle roof from a trunk stowage compartment. Such a device is relatively complex and has a relatively high number of moving parts, making it expensive to manufacture. Likewise, U.S. Pat. No. 6,637,802 to Obendick on Oct. 28, 2003 teaches another complicated mechanism that maintains two top panels in a substantially parallel configuration during deployment and retraction of a vehicle convertible roof.

As such, there is a need for a relatively simple device that can be used to automatically raise or lower a convertible roof, and more particularly a hard-top convertible roof, that has a minimum of parts. Such a needed device would provide several locking means for securing the roof in its top-up and top-down positions. Further, such a needed device would minimize openings in a trunk space during deployment or retraction of the roof so as to mitigate damage done to items in the trunk space by inclement weather, or the like. The present invention accomplishes these objectives.

SUMMARY OF THE INVENTION

The present device is a retractable hard-top roof for a convertible-roof vehicle. The vehicle has a roof stowage deck in a rear portion thereof, and a windscreen. The roof comprises a forward roof panel and a rear roof panel. The panels fit together flush when the roof is in a top-up position. In a top-down position the panels are stowed in the roof stowage deck in a generally parallel orientation.

The roof includes a pair of roof hinge mechanisms for moving the roof panels between the top-up position and the top-down position with a first linear actuator, such as a hydraulic cylinder or the like. The roof further includes a pair of tonneu cover mechanisms for raising and then lowering a tonneu cover when the roof panels are moved between their top-up and top-down positions. The tonneu cover includes a pair of side flaps that separate elevationally from a middle tonneu cover panel as the tonneu cover is raised and then pivotally retract below the middle tonneu cover panel, thereby providing clearance for the roof hinge mechanisms when the roof is in the top-up position.

Preferably the roof includes a roof deck lid for further covering the stowage deck and abutting the tonneu cover when both are in a closed position. Moreover, to allow locking of the forward panel to the windscreen, a front roof panel lock may be included. Pivoting hooks of the front panel lock may be used to secure the panels within the roof stowage deck so as to prevent rattling thereof while the vehicle is in motion.

The roof may further include pillar roof locks for locking the roof hinge mechanisms in the top-up position until released.

In use, with the roof in its top-down position, wherein the roof panels are stowed in the roof stowage deck and covered by the tonneu cover and roof deck lid, the roof deck lid is released and the first linear actuator of each roof hinge mechanism is actuated. Each roof hinge mechanism raises the forward roof panel, which remains substantially horizontal throughout its movement from the top-down to the top-up positions. Further, each roof hinge mechanism raises the rear roof panel such that the roof panels become aligned and flush to form the roof of the vehicle. During this time the tonneu cover is raised, its side flaps are retracted, and the tonneu cover is lowered. As the roof achieves its top-up position, the forward panel abuts the windscreen, where it may be locked thereto with the front roof panel lock. The pillar roof lock snaps into the locked position, and the process is complete.

To retract the roof from the top-up position to the top-down position, the pillar roof lock is unlocked, the front roof panel lock is unlocked, and the roof deck lid is released and raised. The first linear actuator is then reversed, causing each roof hinge mechanism to retract the forward and rear roof panels into the roof stowage deck. The tonneu cover raises, its side flaps extend, and it then lowers as the roof assumes its top-down positions. The roof deck lid is then closed, and the front roof panel lock may engage the roof anchors in the roof stowage deck to secure the roof panels against rattling.

The present invention can be used to automatically raise or lower a convertible roof, and more particularly a hard-top convertible roof, with only a minimum of parts. Further, the present invention provides several locking means for securing the roof in its top-up and top-down positions. The present device further minimizes openings in a trunk space during deployment or retraction of the roof so as to mitigate damage done to items in the trunk space by inclement weather. Other features and advantages of the present invention will become apparent from the following more detailed description, taken in conjunction with the accompanying drawings, which illustrate, by way of example, the principles of the invention.

DESCRIPTION OF THE DRAWINGS

FIG. 6A is a partial side-elevational view of a roof deck lid of the invention in a closed position;

FIG. 6B is a partial side-elevational view of the roof deck lid of the invention in an opened position;

FIG. 7A is a partial perspective view of a header lock of the invention showing a lock male locating pin approaching a female alignment aperture;

FIG. 7B is a partial top-pan view of the header lock of the invention, illustrated with the header lock in a locked position;

FIG. 7C is a partial top-plan view of the header lock of the invention, showing the header the header lock mechanism in an unlocked position;

FIG. 8A is a partial side-elevational view of a pillar roof lock of the invention, illustrated in a locked position;

FIG. 8B is a partial side-elevational view of the pillar roof lock of the invention, illustrated in an unlocked position;

FIG. 9A is a partial perspective view of the roof in the top-down position and stowed in a roof stowage deck in a locked position;

FIG. 9B is a partial perspective view of the roof in the top-down position and stowed in the roof stowage deck in an unlocked position; and FIG. 9C is a partial end-elevational view of the roof in the top-down position and stowed in the roof stowage deck in the locked position.

DETAILED DESCRIPTION OF THE PREFERRED EMBODIMENT

Illustrative embodiments of the convertible roof are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1A:
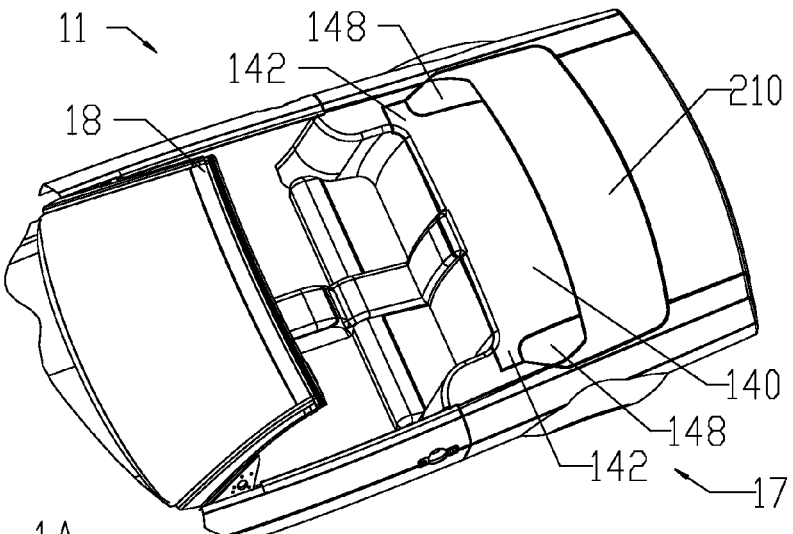
FIG. 1A is a partially cut-away perspective view of a convertible roof vehicle, shown with a roof of the invention in a top-down position.
Figure 1B:
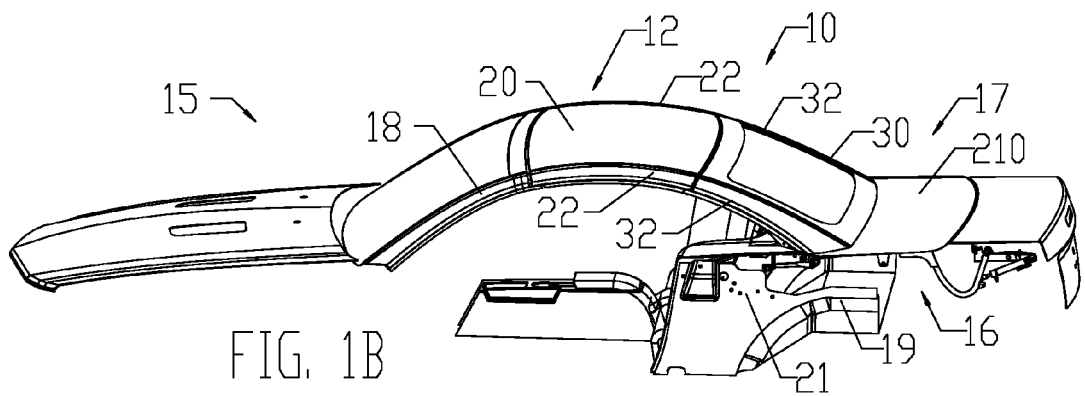
FIG. 1B is a partially cut-away perspective view of the convertible roof vehicle, shown with the roof of the invention in a top-up position.
Figure 3A:
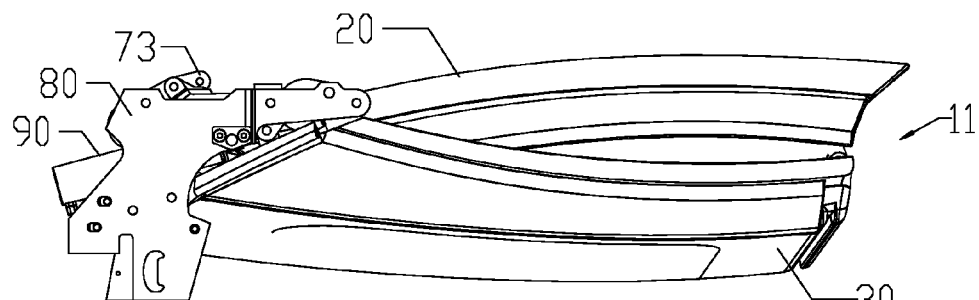
FIG. 3A is a partial side-elevational view of the roof hinge mechanism of the invention, illustrated in the top-down position.
Figure 3B:
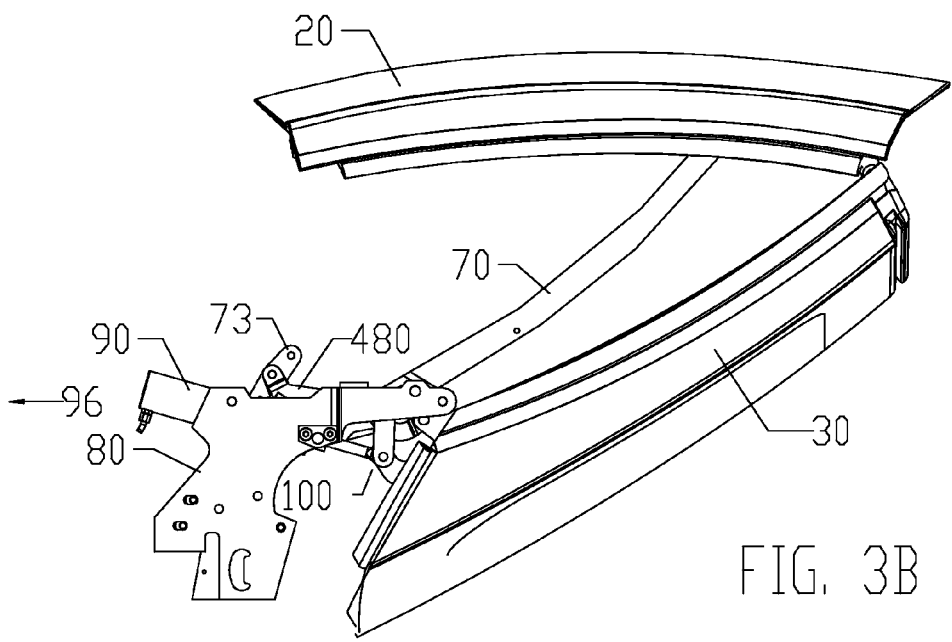
FIG. 3B is a partial side-elevational view of the roof hinge mechanism of the invention, illustrated between the top-down position and the top-up position.
Figure 3C:
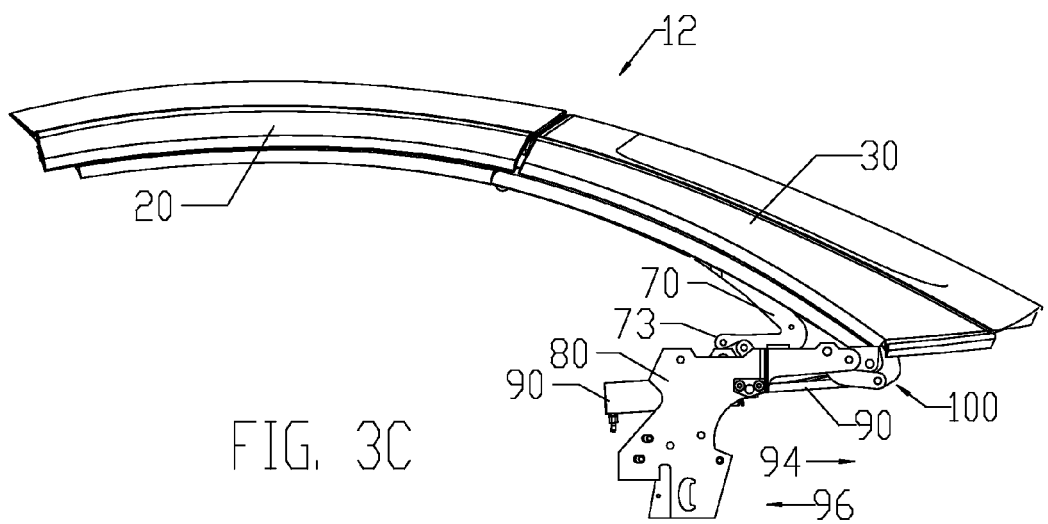
FIG. 3C is a partial side-elevational view of the roof hinge mechanism of the invention, illustrated in the top-up position.

FIGS. 1A and 1B illustrate a roof 10 for a convertible roof vehicle 15. The vehicle 15 has a roof stowage deck 16 in a rear portion 17 thereof, and a windscreen 18. The roof 10 comprises a forward roof panel 20 and a rear roof panel 30. Preferably the panels 20,30 are made from a rigid material, such as aluminum or steel, and include an upholstered lower side (not shown) applicable to the vehicle 15. The panels 20,30 fit together flush when the roof 10 is in a top-up position 12, illustrated in FIG. 1B. In a top-down position 11, illustrated in FIG. 1A, the panels 20,30 are stowed in the roof stowage deck 16 in a generally parallel orientation (FIG. 3A).

Figure 1C:
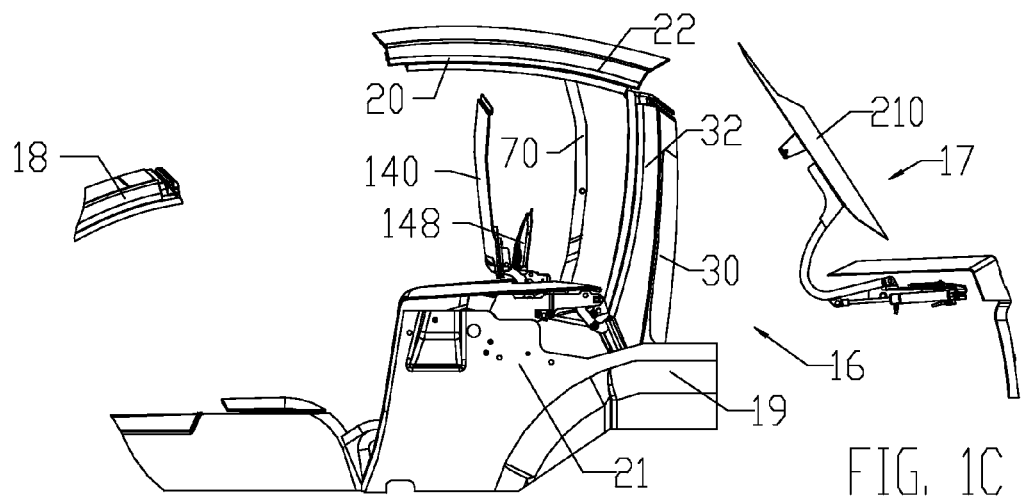
FIG. 1C is a partial side-elevational view of the convertible roof vehicle, shown with the roof of the invention between the top-down position and the top-up position.
Figure 2A:
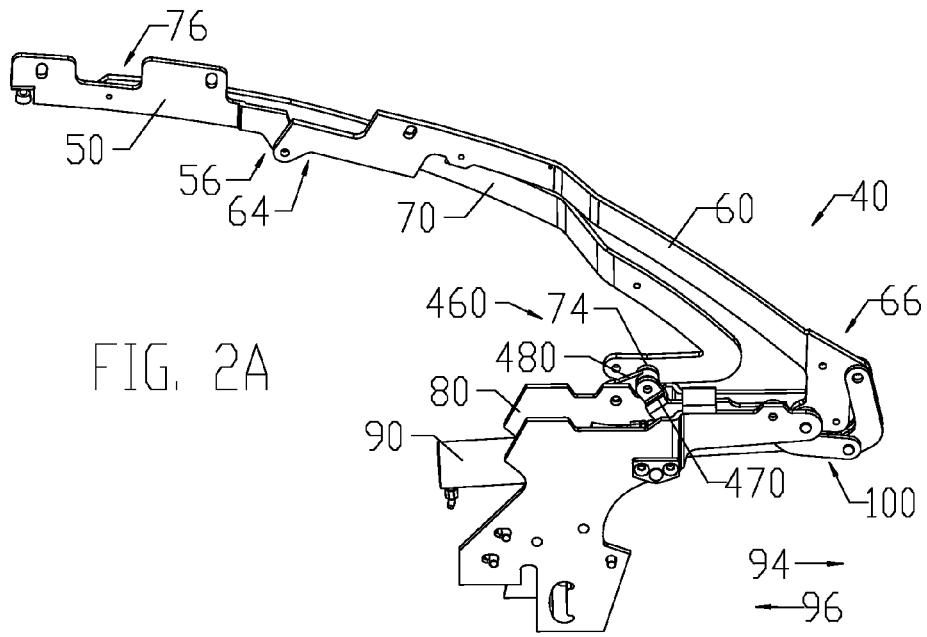
FIG. 2A is a partial perspective view of the invention, illustrating a roof hinge mechanism in the top-up position.
Figure 2B:
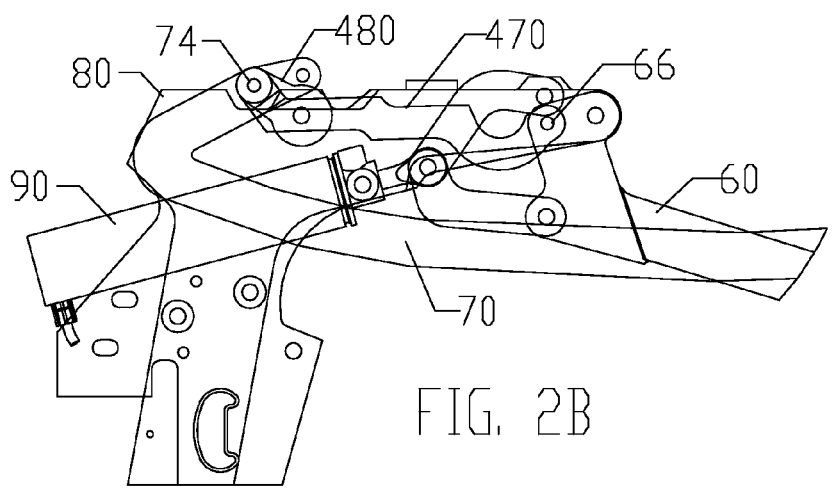
FIG. 2B is a partial side-elevational view of the roof hinge mechanism of the invention, illustrated in the top-down position.
Figure 2C:
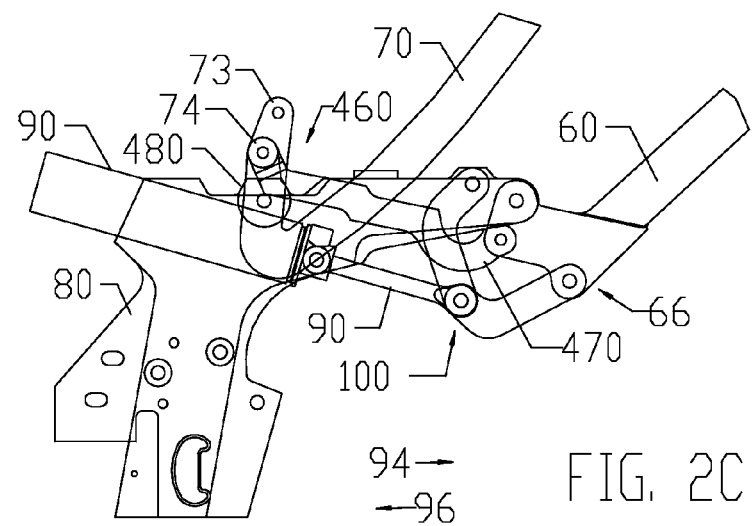
FIG. 2C is a partial side-elevational view of the roof hinge mechanism of the invention, illustrated between the top-down position and the top-up position.

The roof 10 includes a pair of roof hinge 40 mechanisms for moving the roof panels 20,30 between the top-up position 12 and the top-down position 11. Each roof hinge 40 comprises an upper linkage 50 fixed to one side 22 of the forward roof panel 20 (FIGS. 1B-1C). A main lever 60 is fixed to one side 32 of the rear roof panel 30, and a top side 64 of the main lever 60 is pivotally fixed to a rear end 56 of the upper linkage 50. A control arm 70 is pivotally fixed at a top end 76 thereof to the upper linkage 50 and pivotally at a lower end 74 thereof to a guide linkage 480 that is rotationally fixed to a fixed base 80. The fixed base 80 is fixed to the vehicle 15, preferably within a vehicle's side body structures 21. A first linear actuator 90, such as a hydraulic cylinder or the like, is fixed between the fixed base 80 and a linkage arrangement 100 that is pivotally fixed to a lower end 66 of the main lever 60.

Each roof hinge mechanism 40 further includes a guiding mechanism 460 that includes a push-pull rod 470 (FIGS. 2A, 2B, 2C and 3B) pivotally fixed to the lower end 66 of the main lever 60 and to a guide linkage 480 that is rotationally fixed to the lower end 74 of the control arm 70 and the fixed base 80.

The roof 10 further includes a pair of tonneu cover mechanisms 110, each of which comprise a pivot link 73 extending past the lower end 74 of the control arm 70 (FIGS. 2C, 3A-3C and 4A-4C). The pivot link 73 is pivotally fixed to a link arrangement 120 that is itself pivotally fixed to a tonneu bracket 130. Each tonneu bracket 130 is fixed to opposing sides 142 (FIG. 1A) of a tonneu cover 140 that includes a pair of side flaps 148, each of which is pivotally fixed at a rear end 149 thereof to a side flap retracting mechanism 150.

Figure 5A:
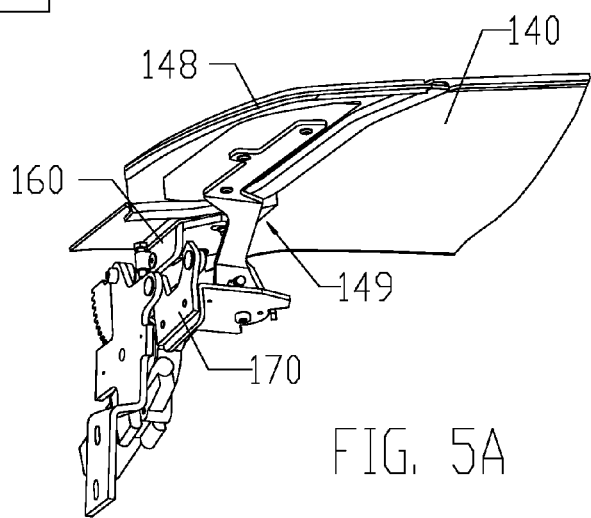
FIG. 5A is a partial perspective view of a side flap bracket of the invention, illustrated with side flaps of the tonneu cover in an extended position.
Figure 5B:
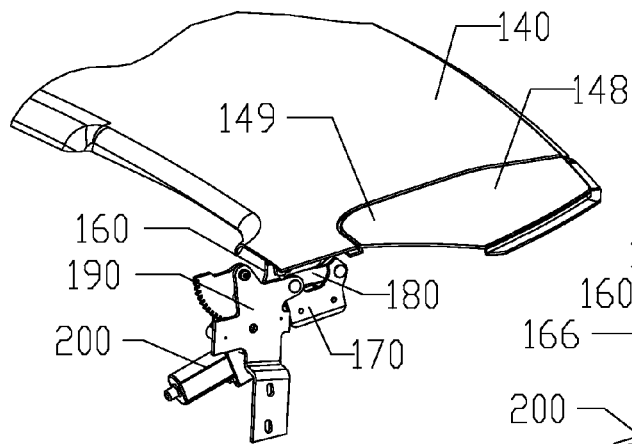
FIG. 5B is a partial perspective view of the side flap bracket of the invention, illustrated with side flaps of the tonneu cover in an extended position.
Figure 5C:
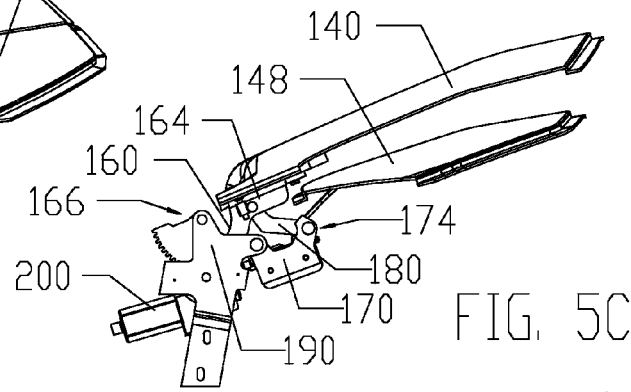
FIG. 5C is a partial side elevational view of the side flap bracket of the invention, illustrated with the side flaps of the tonneu cover in a partially raised position.
Figure 5D:
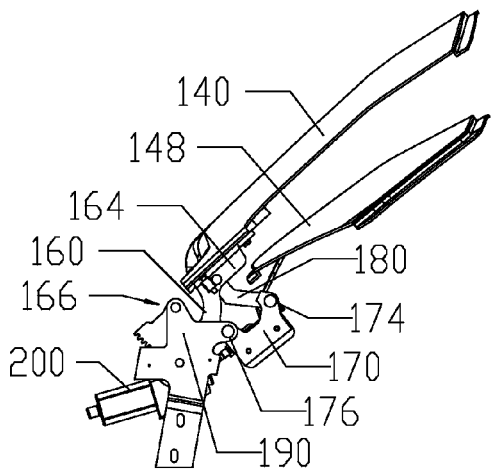
FIG. 5D is a partial side elevational view of the side flap bracket of the invention, illustrated with the side flaps of the tonneu cover in a fully raised position.
Figure 5E:
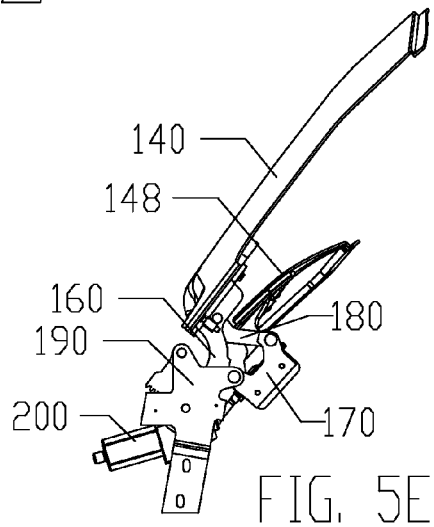
FIG. 5E is a partial side elevational view of the side flap bracket of the invention, illustrated with the side flaps of the tonneu cover in a rotated and retracted position.
Figure 5F:
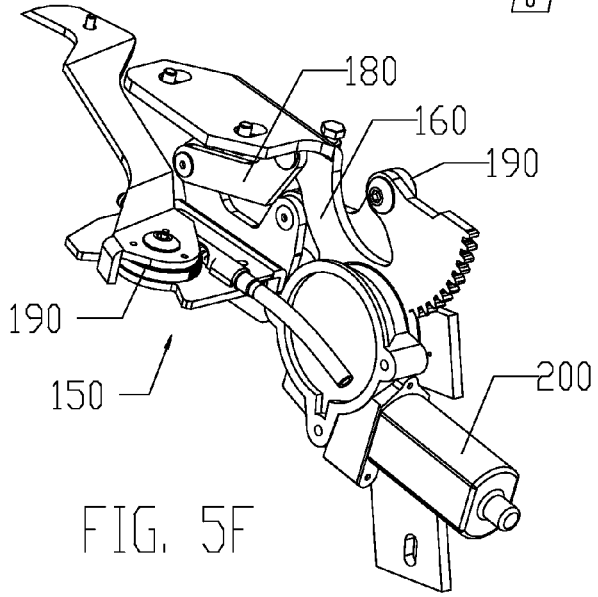
FIG. 5F is a partial perspective view of the side flap bracket of the invention, illustrating a helical gear thereof.

Preferably each side flap retracting mechanism 150 includes an upper side flap bracket 160 rigidly fixed to one of the tonneu brackets 130. The upper side flap bracket 160 is substantially parallel to a lower side flap bracket 170, both of which are connected by a forward linkage 180 and a rear linkage 190 at their forward ends 164,174, respectively, and rear ends 166,176, respectively (FIGS. 5A-5E). Each side flap 148 is fixed to one lower side flap bracket 170 pivotally through a helical gear 190 driven by a geared motor 200. As such, when the tonneu brackets 130, each fixed to the tonneu cover 140, open to about 45°, each lower side flap bracket 170 becomes offset from the tonneu cover 140 (FIGS. 5C and 5D). This allows the geared motor 200 to actuate the helical gear 190 (FIG. 5F) to pivotally retract the side flap 148 under the tonneu cover 140 (FIG. 5E). The side flaps 148 are each retracted as the roof 10 moves from the top-down position 11 to the top-up position 12 so as to allow the main levers 60 and control arms 70 clearance past the tonneu cover 140.

The roof 10 further preferably includes a roof deck lid 210 for further covering the stowage deck 16 and abutting the tonneu cover 140 when both are in a closed position 220. The roof deck lid 210 is fixed to a deck lid hinge 230 (FIGS. 5A and 5B) that is itself pivotally fixed to a hinge bracket 240 that is bolted to the vehicle 15 rear body structure (not shown). A second linear actuator 250, such as a hydraulic cylinder or the like, is slidably fixed to the hinge bracket 240 at a proximal end 254 thereof, such as by a bolt 253 (FIG. 5B). The second linear actuator 250 includes an actuator rod 260 that is pivotally fixed at a distal end 266 thereof to the deck lid hinge 230. A mechanical deck lid latch (not shown), common in the art, is fixed to the underside of the deck lid and actuated by one end of a flexible cable 280. A second end 286 of the cable 280 is connected to the proximal end of the second linear actuator 250, such that when the second linear actuator 250 is actuated it slides backward to pull the flexible cable 280, thereby releasing the mechanical deck lid latch. Subsequently, the second linear actuator 250 pushes the deck lid hinge 230 upward to cause the deck lid 210 to pivot upward and rearward away from the roof panels 20,30, allowing same to pass thereby. Actuating the second linear actuator 250 in the opposite direction reverses the process.

To allow locking of the forward panel 20 to the windscreen 18, a front roof panel lock 290 is preferably included (FIGS. 7A-7C). A pair of lock male parts 270 are fixed to the forward roof panel 20, each of which comprises a locating pin 300 and a hook 310 which are pivotally fixed to the lock male body. The lock 290 also includes a pair of lock female parts 370 which are fixed to the windscreen frame 18, and each comprises a locating aperture 320 and a lock pin 330. Each locating pin 300 is aligned with a locating aperture 320 in the windscreen 18, and each hook 310 is engaged to the lock pin 330 in the lock female part 370. One end 314 of each hook 310 is pivotally fixed to one end 344 of a push rod 340. The other end 346 of each push rod 340 is fixed to a pivoting actuator arm 350, which in turn is fixed to a distal end 366 of a third linear actuator 360. As such, when the third linear actuator 360 is actuated in a first direction 380, the pivoting actuator arm 350 rotates to push each push rod 340 outwardly, thereby retracting each hook 310. Alternately, actuating the third linear actuator 360 in a second direction 390 causes the pivoting actuator arm 350 to rotate in the opposite direction to pull each push rod 340 inwardly, thereby engaging each hook 310 to each lock pin 330 to lock the front roof panel 20 to the windscreen 18.

When the roof 10 is in the top-down position (FIGS. 9A-9C), the hooks 310 in such an embodiment engage a pair of roof anchors 450 fixed either within the stowage deck 16, or alternately on the rear end of the rear roof panel 30, to lock the retracted roof panels 20,30 in their substantially parallel and retracted top-down position 11. As such, during movement of the vehicle 15, such panels 20,30 are prevented from rattling against each other and the vehicle 15.

Preferably the roof 10 further includes a pair of pillar roof locks 400 that each comprise a hook 410 pivotally connected to the main lever 60 (FIGS. 8A and 8B). A locking pin 420 is fixed to the control arm 70. The hook 410 is connected at one end 414 to a release cable 430 and to a counteracting tension spring 440 fixed to the main lever 60. As such, when the release cable 430 is pulled, preferably by the actuator arm 35 or the hook end 314, the hook 410 rotates to disengage the locking pin 420, allowing the main lever 60 and the control arm 70 to move relative to each other. The tension spring 440 biases the hook 410 to engage the locking pin 420. The hook 410 is shaped so that as the locking pin 420 passes the hook 410 as the main lever 60 and the control arm 70 are moved into their top-up positions 12, the hook 410 rotates back and then captures the locking pin 420 at the urging of the tension spring 440.

In use, to raise the roof 10 into the top-up position 12 from its top-down position 11, wherein the roof panels 20,30 are stowed in the roof stowage deck 16 and covered by the tonneu cover 140, actuating the first linear actuator 90 in a first direction 94 (FIGS. 3A-3C) causes the control arm 70 to pivot up out of the roof stowage deck 16. The control arm 70, main lever 60, upper linkage 50, and the fixed base 80 all form substantially a parallelogram throughout their moving from the top-down position 11 to the top-up position 12 (FIG. 1C). As such, the forward roof panel 20 remains substantially horizontal throughout its movement from position 11 to position 12. In the top-up position 12, the roof panels 20,30 become aligned and flush to form the roof 10 of the vehicle 15, the forward panel 20 abutting the windscreen 18. During movement of the roof panels 20,30, the guide link 480 adjusts the position of the control arm 70, resulting in a visually smooth and substantially horizontal movement of the forward panel 20. The guiding mechanism 460 further allows the roof panels 20,30 to be folded compactly together when in the top-down position 11, which further allows a visually flush and uniform body styling design of the rear portion 17 of the vehicle 15. Moreover, the guiding mechanism 460 allows the roof hinge mechanisms 40 to be positioned relatively high above a rear wheel housing 19 of the vehicle 15, and permits the rear end of the rear roof panel 30 to pivot above the wheel housing 19 without interference.

Figure 4A:
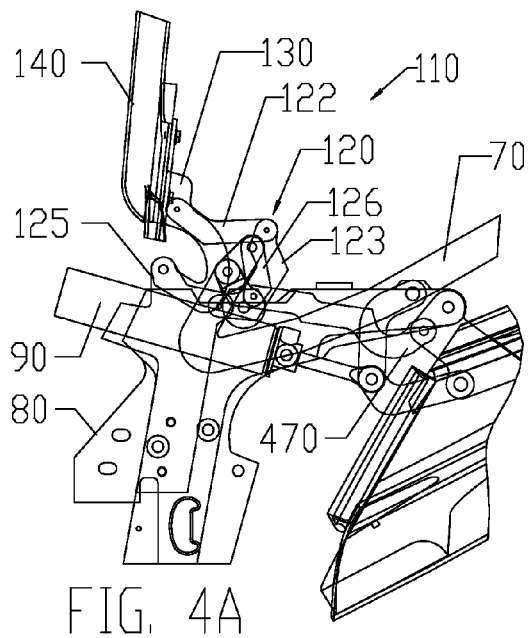
FIG. 4A is a partial side-elevational view of the roof hinge mechanism of the invention, illustrated in the top-up position.
Figure 4B:
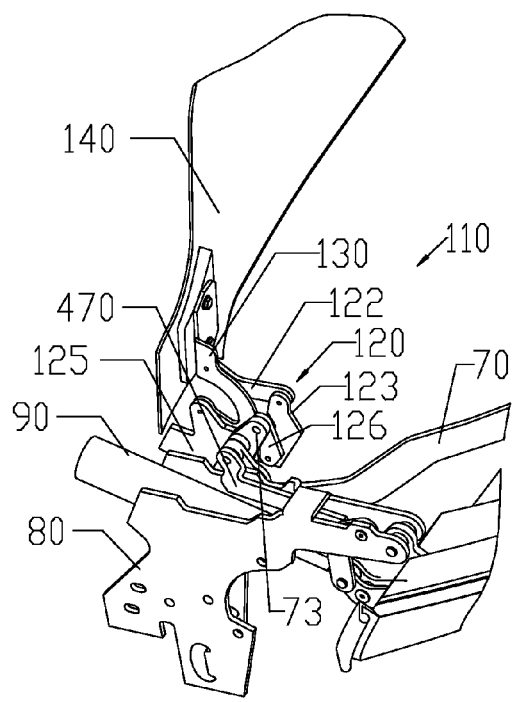
FIG. 4B is a partial perspective view of the roof hinge mechanism of the invention, illustrated between the top-down position and the top-up position.
Figure 4C:
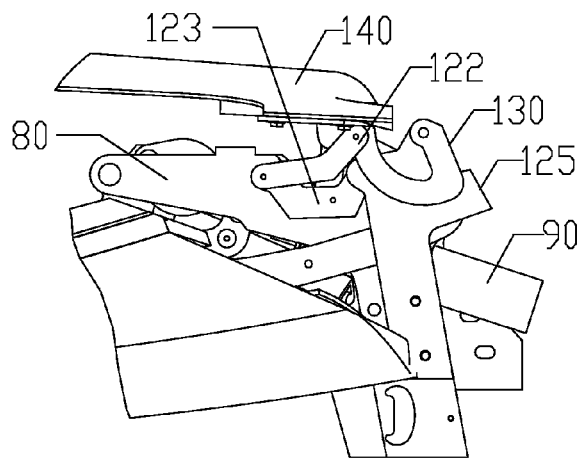
FIG. 4C is a partial side-elevational view of the roof hinge mechanism of the invention, illustrated in the top-down position.

The link arrangement 120 causes the tonneu cover 140 to raise and then lower once while the roof hinge mechanisms 40 traverse from one position 11,12 to the other position 12,11. As such, the tonneu cover 140 is in its raised position as the forward roof panel 20 passes thereby between the top-down position 11 and the top-up position 12 (FIGS. 4A and 4B). The tonneu cover 140 is in a lowered position when the roof is in either the top-up or top-down positions 12,11 (FIGS. 1A and 1B). The link arrangement 120 includes links 122, 123, 125, and 126 as best illustrated in FIGS. 4A and 4B. One end of link 126 is pivotally connected to the middle of link 123 and the other end is pivotally connected to the pivot link 73. Action of the pivot end 73 on the link arrangement 120 causes the tonneu cover 140 to raise and then lower during each top-up and top-down cycles. Alternatively, the tonneu cover 140 can be actuated directly by a geared motor 200 or the like, as illustrated in (FIGS. 5A-5E).

While a particular form of the invention has been illustrated and described, it will be apparent that various modifications can be made without departing from the spirit and scope of the invention. For example, various linear actuators may be used, such as electric linear actuators (not shown). Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A roof for a convertible roof vehicle having a roof stowage deck in a rear portion thereof and a windscreen, the roof comprising:

a forward roof panel and a rear roof panel;

a pair of roof hinge mechanisms each comprising an upper linkage fixed to one side of the forward roof panel, the upper linkage having a rear end, a main lever fixed to one side of the rear roof panel, a top side of the main lever pivotally fixed to the rear end of the upper linkage, a control arm pivotally fixed at a top end thereof to the upper linkage, a fixed base pivotally fixed to a lower end of the control arm and fixed proximate the roof stowage deck of the vehicle, a guiding mechanism including a guide linkage pivotally fixed at one end to the lower end of the control arm and a front end of a push-pull rod, the other end of the guide linkage pivotally fixed to the fixed base, the push-pull rod pivotally fixed at a rear end thereof to the lower end of the main lever, and a first linear actuator fixed between the fixed base and a linkage arrangement that is pivotally fixed to a lower end of the main lever; and a pair of tonneu cover mechanisms each comprising a pivot link extending past the lower end of one of the control arms of one of the roof hinge mechanisms, the pivot link pivotally fixed to a link arrangement that is itself pivotally fixed to a tonneu bracket, each tonneu bracket fixed to opposing sides of a tonneu cover, the tonneu cover including a pair of side flaps, each pivotally fixed at a rear end thereof to a side flap retracting mechanism;

whereby with the roof in a top-down position such that the roof panels are stowed substantially horizontally in the roof stowage deck and covered by the tonneu cover, the roof is put into a top-up position by actuating the first linear actuator in a first direction to cause the control arm to pivot up, simultaneously causing the tonneu cover to pivot up and forward, the control arm, main lever, upper linkage and fixed base forming substantially a parallelogram, such that the forward roof panel remains substantially horizontal, the side flaps of the tonneu bracket pivoting inward to provide clearance for the control arm and the main lever, the tonneu cover then pivoting back downward to cover the roof stowage deck, the forward and rear roof panels becoming aligned to form the roof of the vehicle with the forward roof panel abutting the windscreen, the first linear actuator being actuated in a second direction to reverse the process and cause the roof to go from the top-up position to the top-down position.

2. The roof of claim 1 wherein each side flap retracting mechanism includes an upper side flap bracket fixed to one of the tonneu brackets and substantially parallel to a lower side flap bracket, both the upper and lower side flap brackets connected by a forward linkage and a rear linkage at their forward and rear ends, respectively, one side flap fixed to each lower side flap bracket through a helical gear driven by a motor, whereby when the tonneu bracket, fixed to the tonneu cover, opens to about 45°, the lower side flap bracket becomes offset from the tonneu cover, allowing the motor to actuate the helical gear to pivotally retract the side flap under the tonneu cover.

3. The roof of claim 1 further including a roof deck lid further covering the stowage deck and abutting the tonneu cover when both are in a closed position, the roof deck lid fixed to a deck lid hinge pivotally fixed to a hinge bracket fixed to the vehicle, a second linear actuator slidably fixed to the hinge bracket at a proximal end and having an actuator pivotally fixed at a distal end thereof to the deck lid hinge, a mechanical deck lid latch fixed to the deck lid and actuated by one end of a flexible cable that is connected at a second end thereof to the proximal end of the second linear actuator, whereby when the second linear actuator is actuated it slides backward to pull the flexible cable, releasing the mechanical deck lid latch, and then pushing the deck lid hinge upward to cause the deck lid to pivot upward and rearward away from the roof panels.

4. The roof of claim 1 further including a front roof panel lock that includes a pair of lock male parts each comprising at least one locating pin and at least one pivoting hook fixed to the forward roof panel, each locating pin aligning with a locating aperture in a female lock part, and each hook engaged to a lock pin in the female lock part, each female lock part fixed to the windscreen, one end of each hook pivotally fixed to one end of a push rod, the other end of each push rod fixed to a pivoting actuator arm that is itself fixed to a distal end of a third linear actuator, whereby when the third linear actuator is actuated in a first direction, the pivoting actuator arm rotates to push each push rod outwardly, retracting each hook, and when the third linear actuator is actuated in a second direction, the pivoting actuator arm rotates to pull each push rod inwardly, engaging each hook to one lock pin to lock the forward roof panel to the windscreen.

5. The roof of claim 1 further including a pillar roof lock comprising a hook pivotally connected to the main lever and a locking pin fixed to the control arm, the hook connected at one end to a release cable and a counteracting tension spring fixed to the main lever, whereby when the release cable is pulled the hook rotates to disengage the locking pin, allowing the main lever and the control arm to move relative to each other, the tension spring biasing the hook to engage the locking pin.

6. The roof of claim 4 further including a pair of roof anchors fixed within the stowage deck and aligned with the hooks, whereby when the roof is in the top-down position the pair of hooks may engage the anchors to fix the roof panels in the top-down position to prevent the roof panels from rattling when the vehicle is in motion.

* * * * *